United States Patent
Egami et al.

(10) Patent No.: US 9,308,813 B1
(45) Date of Patent: Apr. 12, 2016

(54) UTILITY VEHICLE

(71) Applicant: KAWASAKI JUKOGYO KABUSHIKI KAISHA, Hyogo (JP)

(72) Inventors: Koichi Egami, Akashi (JP); Takuma Nozaki, Aioi (JP); Yuji Ohshita, Osaka (JP); Jun Takagi, Kobe (JP); Yoshihiko Orihashi, Kobe (JP); Masashi Fukuuchi, Kobe (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 14/585,875

(22) Filed: Dec. 30, 2014

(51) Int. Cl.
| | |
|---|---|
| *B60K 15/063* | (2006.01) |
| *B60K 15/03* | (2006.01) |
| *F02M 37/14* | (2006.01) |
| *F02M 37/22* | (2006.01) |
| *B60K 15/035* | (2006.01) |
| *B60K 15/01* | (2006.01) |

(52) U.S. Cl.
CPC ........... *B60K 15/03006* (2013.01); *B60K 15/01* (2013.01); *B60K 15/035* (2013.01); *F02M 37/14* (2013.01); *F02M 37/221* (2013.01); *B60K 2015/03236* (2013.01); *B60K 2015/03243* (2013.01)

(58) Field of Classification Search
CPC ...... B62D 25/082; B62D 25/085; B60K 5/00; B60K 5/12; B60K 15/00; B60K 15/063; B60K 15/067; B60K 15/03006; B60K 15/01; B60K 15/035; B60K 13/00; B60K 13/02; F02M 35/04; F02M 35/048; F02M 35/161; F02M 35/162; F02M 37/14; F02M 37/221
USPC ................ 180/291, 292, 296, 68.3, 69.4
See application file for complete search history.

(56) References Cited

U.S. PATENT DOCUMENTS

| | | | | |
|---|---|---|---|---|
| 7,690,360 | B2* | 4/2010 | Kuji ..................... | F02M 37/103 123/509 |
| 7,882,912 | B2* | 2/2011 | Nozaki et al. .......... | B60K 13/02 180/291 |
| 8,973,693 | B2* | 3/2015 | Kinsman et al. ........ | B60R 21/13 180/89.1 |
| 2010/0024775 | A1* | 2/2010 | Takahashi et al. ... | F02M 37/007 123/470 |

FOREIGN PATENT DOCUMENTS

JP 2010-195120 9/2010

\* cited by examiner

*Primary Examiner* — John Walters
(74) *Attorney, Agent, or Firm* — Wenderoth, Lind & Ponack, L.L.P.

(57) ABSTRACT

The present invention provides a utility vehicle including fuel system components located compactly. The utility vehicle includes a single or a plurality of seat rows, a cargo bed, a cabin, and an engine. The utility vehicle further includes a fuel tank accommodated in a lower space of one of the seat rows, a fuel system mounting bracket provided next to the fuel tank in the lower space and fixed to a seat frame, and a fuel feed pump and a single or a plurality of fuel system accessories mounted to the fuel system mounting bracket.

7 Claims, 7 Drawing Sheets

UTILITY VEHICLE

BACKGROUND OF THE INVENTION

1. Field of the Invention

The present invention relates to a utility vehicle, and particularly to location of a fuel tank, a fuel feed pump, and a single or a plurality of fuel system accessories.

2. Description of the Prior Art

In a utility vehicle equipped with a gasoline engine, a fuel feed pump is typically located in a fuel tank. On the other hand, in a utility vehicle equipped with a diesel engine, a fuel feed pump is located outside a fuel tank and on a fuel supply path. A fuel feed pump located outside a fuel tank is mounted to a chassis frame or an engine by way of a pump mounting bracket that is provided separately from a mounting bracket for a fuel system accessory.

When a fuel feed pump and a fuel system accessory are mounted to an engine or a chassis frame by way of different brackets, the fuel feed pump and the fuel system accessory need to be mounted or demounted individually for mounting, demounting or maintaining, which causes troublesome work. This configuration increases the number of mounting components. As a prior art reference of this application, JP 2010-195120 A discloses location of a fuel feed pump and a water separator in an agricultural tractor. According to this reference, a fuel tank is located behind a seat and the fuel feed pump and the water separator are located at a support stay of the fuel tank.

SUMMARY OF THE INVENTION

An object of the present invention is to facilitate tasks of mounting and maintaining a fuel feed pump and a fuel system accessory in a utility vehicle. In order to achieve this object, the present invention provides a utility vehicle including a single or a plurality of seat rows, a cargo bed provided behind the seat rows, a cabin accommodating the seat rows, and an engine, the utility vehicle further includes: a fuel tank accommodated in a lower space of one of the seat rows; a fuel system mounting bracket provided next to the fuel tank in the lower space and fixed to a seat frame; and a fuel feed pump and a single or a plurality of fuel system accessories mounted to the fuel system mounting bracket.

The present invention enables simultaneously mounting, demounting, or maintaining of the fuel system components, namely, a fuel tank, a fuel feed pump, and a fuel system accessory by opening a seat plate. This configuration improves efficiency of these tasks.

Since the seat plate of a seat covers the fuel tank, the fuel feed pump, and the fuel system accessory from above, the fuel tank, the fuel feed pump, and the fuel system accessory are protected from outside.

The utility vehicle thus configured according to the present invention may include any of the following configurations.

(a) The fuel system mounting bracket is bridged between upper and lower frame members of the seat frame. In this configuration, the fuel system mounting bracket can serve as a constituent member of the seat frame and rigidity of the seat frame can be balanced.

(b) The fuel tank is located at an end in a vehicle width direction in the lower space, and the fuel feed pump and the single or the plurality of fuel system accessories are located closer to a center in the vehicle width direction than the fuel tank. This configuration make it possible to direct a fuel supply port of the fuel tank to outside the vehicle. Therefore, the fuel supply port is easily accessible from a lateral side of the vehicle and a fuel supply task is thus facilitated. Furthermore, the fuel feed pump and the fuel system accessory can be protected by the fuel tank located close to an end in the vehicle width direction.

(c) The single or the plurality of fuel system accessories includes at least one of a fuel filter and a fuel-water separator. This configuration facilitates the task of maintaining the fuel filter and the fuel-water separator along with the fuel feed pump.

(d) One of the fuel system accessories is provided, at an upper end, with an air vent path and a fitting for a fuel return hose communicating with the air vent path. This configuration enables air in fuel being supplied to be quickly separated, discharged, and returned to the fuel tank through a fuel return path.

(e) The fuel system mounting bracket has a single vertical mounting surface, and the fuel feed pump and the single or the plurality of fuel system accessories are mounted to the single mounting surface. This configuration enables the task of mounting the fuel feed pump and the fuel system accessory to be performed easily in a same direction, and also allows them to be located compactly. This configuration also shortens fuel piping.

(f) A resin fitting connected to a fuel return hose is insert molded into an upper wall of the fuel tank to project upward. This configuration improves sealing at a fitting portion between the fuel tank and the fuel return hose.

BRIEF DESCRIPTION OF THE DRAWINGS

The above and other objects, features and advantages of the present invention will be become more apparent from the following description taken in connection with the accompanying drawings, in which.

DETAILED DESCRIPTION OF THE PREFERRED EMBODIMENTS

FIGS. 1 to 7 show a utility vehicle according to the present invention. A preferred embodiment of the present invention will now be described with reference to these figures. For convenience of description in this embodiment, a forward travelling direction of the vehicle is called "front" of the vehicle and each of components of the vehicle, and a right and left direction as seen from a driver or passenger is called "a right and left direction" of the vehicle and each of the components of the vehicle.

Figure 1:
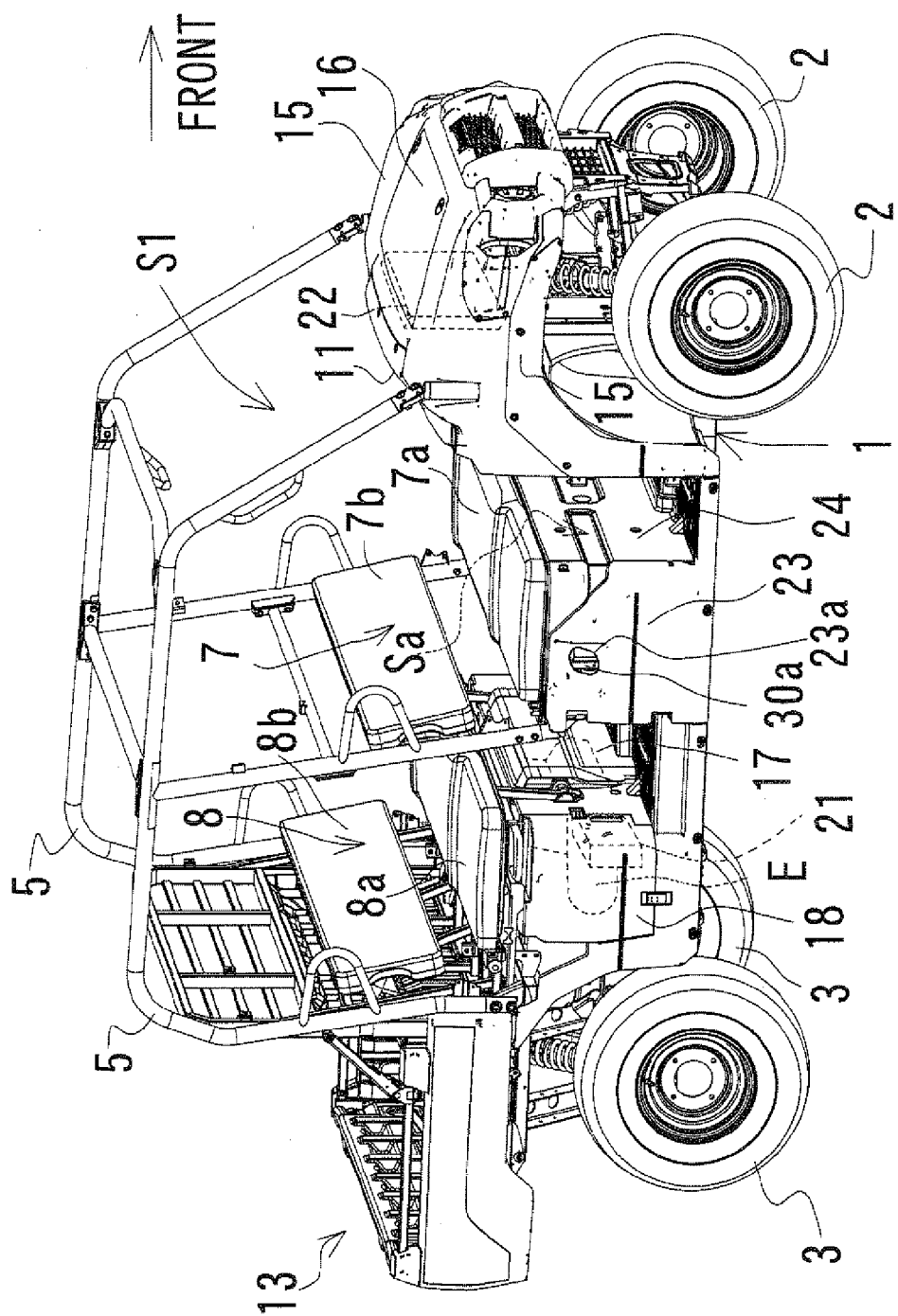
FIG. 1 is a perspective view viewed from upper right, of a utility vehicle according to the present invention.

FIG. 1 is a perspective view of the entire utility vehicle. The utility vehicle includes a chassis frame 1, right and left front wheels 2 located at a front end of the chassis frame 1, and right and left rear wheels 3 located at a rear end of the chassis frame 1. A cabin (riding space) S1 is located between the front wheels 2 and the rear wheels 3 in a front-rear direction, and is surrounded with a R.O.P.S. 5. The cabin S1 accommodates a bench type front sheet 7 and a bench type rear sheet 8. The front seat 7 includes a seat plate 7a and a back rest 7b, whereas the rear seat 8 also includes a seat plate 8a and a back rest 8b. A dashpanel (dashboard) 11 is provided at a front end of the cabin S1, and right and left front fenders 15 and a hood (bonnet) 16 are provided ahead of the dashpanel 11. A dump truck type cargo bed 13 is provided behind the cabin S1. The R.O.P.S. 5 is an abbreviation for a rollover protective structure.

An engine storage chamber or an engine room 17 is provided below the seat plate 8a of the rear seat 8, substantially at a center in a vehicle width direction. The engine storage chamber 17 extends to below a front portion of the dump truck type cargo bed 13 and accommodates an engine E and a transmission (not shown). The engine E according to the present embodiment is a inline type of diesel engine having a plurality of cylinders and a crank shaft extending in the vehicle width direction.

A storage chamber 18 accommodating a battery 21 is provided on a right side next to the engine storage chamber 17 below the seat plate 8a of the rear seat 8. The storage chamber 18 accommodates the battery 21 as well as an intake air cleaner and the like.

A front chamber provided below the hood 16 accommodates an electrical equipment storage box 22 storing various kinds of electrical equipment. Examples of the electrical equipment stored in the electrical equipment storage box 22 include an electrical equipment controller, various kinds of relay device, and a fuse.

The seat plate 7a of the front seat 7 is provided therebelow with a lower space Sa. The lower space Sa has both ends in the vehicle width direction covered with right and left side covers 23, a front end covered with a front cover 24, and a rear end covered with a rear cover (not shown). The right side cover 23 has an opening 23a through which a fuel cap 30a is exposed.

Figure 2:
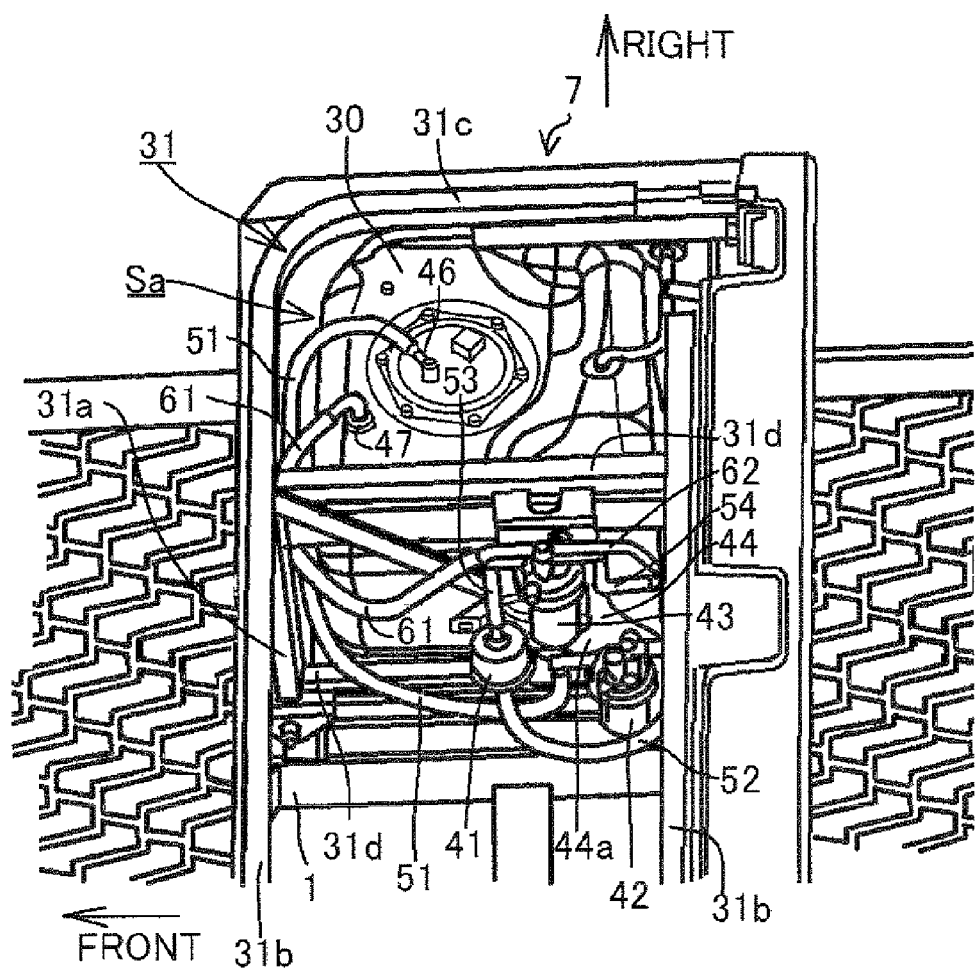
FIG. 2 is a perspective view of a lower space of the utility vehicle shown in FIG. 1, with a front seat being removed.

With reference to FIG. 2, the lower space Sa of the front seat 7 is surrounded with a seat frame 31 that has a rectangular parallelepiped shape extending in the vehicle width direction. The seat frame 31 includes a plurality of leg members 31a (only one is shown in FIG. 2) rising from a bottom of the chassis frame 1, a pair of front and rear lateral members 31b coupled to the upper ends of the plurality of leg members 31a and extending in the vehicle width direction, side members 31c extending backward from both ends in the vehicle width direction of the front lateral members 31b, and a plurality of coupling members 31d provided in parallel with the side members 31c. The plurality of coupling members 31d couples the front and rear lateral members 31b and 31b.

A fuel tank 30 is provided at a right end area in the lower space Sa. The fuel tank 30 is provided, on a left next thereto, with a fuel feed pump 41, a fuel-water separator 42, and a fuel filter with an air vent (hereinafter, simply referred to as the "fuel filter") 43. The fuel-water separator 42 and the fuel filter 43 are exemplified as fuel system accessories according to the present embodiment.

The pair of upper and lower coupling members 31d and 31d are located between the fuel tank 30 and the fuel feed pump 41, the fuel-water separator 42, and the fuel filter 43. A fuel system mounting bracket 44 is bridged between the upper and lower coupling members 31d and 31d. More specifically, an upper end of the fuel system mounting bracket 44 is firmly fixed to the upper coupling member 31d by welding, whereas a lower end of the fuel system mounting bracket 44 is firmly fixed to the lower coupling member 31d by welding. The fuel system mounting bracket 44 has a single substantially vertical mounting surface 44a expanding forward, backward, upward, and downward. The fuel feed pump 41, the fuel-water separator 42, and the fuel filter 43 are demountably or removably mounted to the mounting surface 44a.

The fuel tank 30 has an upper wall provided with a resin fuel supply fitting 46 and a resin fuel return fitting 47. The fuel supply fitting 46 is connected to a first fuel supply hose 51, whereas the fuel return fitting 47 is connected to a first fuel return hose 61.

The first fuel supply hose 51 and the first fuel return hose 61 are located in front of the fuel tank 30, extend leftward, and reach an area accommodating the fuel feed pump 41.

Figure 3:
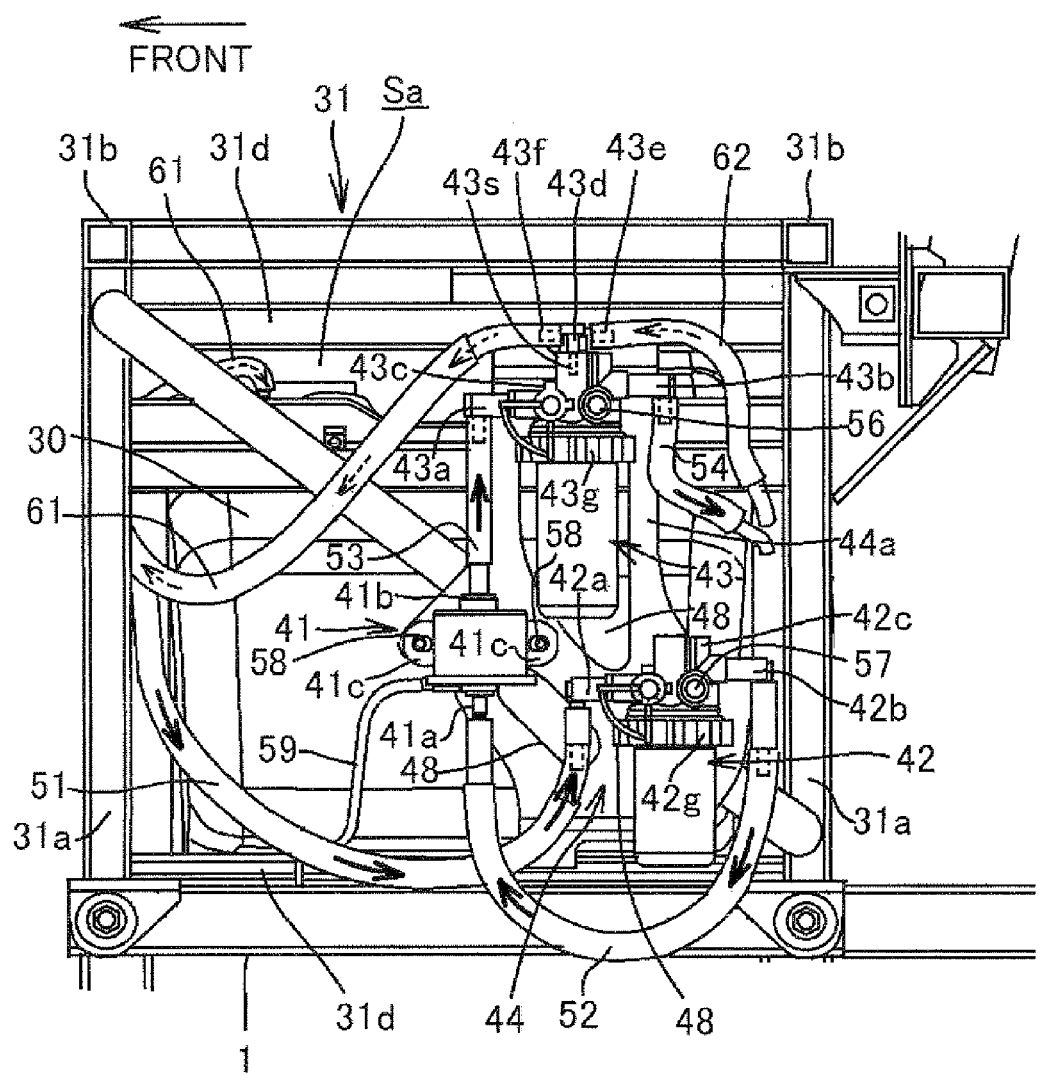
FIG. 3 is a left side view of a fuel feed pump and fuel system accessories of the utility vehicle shown in FIG. 1.

With reference to FIG. 3, the mounting surface 44a of the fuel system mounting bracket 44 has a plurality of (e.g. three) lightening holes 48.

The fuel filter 43 is located at an upper end portion of the mounting surface 44a and is demountably mounted or fixed to the mounting surface 44a by a bolt 56. The fuel-water separator 42 is located at a lower rear end portion of the mounting surface 44a and is demountably mounted or fixed to the mounting surface 44a by a bolt 57. The fuel feed pump 41 is located below the fuel filter 43 and above the fuel-water separator 42. Furthermore, the fuel feed pump 41 is located at a front position of the fuel filter 43. The fuel feed pump 41 is provided, at front and rear ends, with mounted pieces 41c that are firmly fixed to the mounting surface 44a by bolts 58.

The fuel feed pump 41 is an electromagnetic type of pump, and is connected to a drive source lead wire 59. The fuel feed pump 41 has a lower surface provided with an intake pipe 41a projecting downward, and an upper surface provided with a discharge pipe 41b projecting upward, so as to take fuel from below and discharge the fuel upward.

The fuel-water separator 42 is provided, on a front surface of a lid 42c, with a fuel inlet pipe 42a that has an L shape and projects forward. A rear surface of the lid 42c is provided with a fuel outlet pipe 42b that projects backward. Each of the fuel inlet pipe 42a and the fuel outlet pipe 42b has a bent distal end portion extending downward.

The fuel filter 43 is provided, on a front surface of a lid 43c, with a fuel inlet pipe 43a that has an L shape and projects forward. A rear surface of the lid 43c is provided with a fuel outlet pipe 43b that has an L shape and projects backward. Each of the fuel inlet pipe 43a and the fuel outlet pipe 43b has a bent distal portion extending downward. The lid 43c of the fuel filter 43 is integrally provided, at an uppermost end, with a fuel return hose fitting 43d. The fuel return hose fitting 43d is located above the fuel inlet pipe 43a and the fuel outlet pipe 43b, and is provided with a return fuel inlet pipe 43e projecting backward and a return fuel outlet pipe 43f projecting forward. An interior of the fuel return hose fitting 43d communicates with the fuel outlet pipe 43b and the fuel inlet pipe 43a by way of an air vent path 43s provided in the lid 43c, so as to ventilate air. An air component in fuel supplied into the fuel filter 43 is discharged into the fuel return hose fitting 43d thereabove, and is discharged into the fuel tank 30 along with return fuel. The air vent path 43s in the lid 43c is configured to ventilate air but hardly ventilate fuel.

A distal end portion of the first fuel supply hose 51 extending from the fuel tank 30 is connected, from below, to the fuel inlet pipe 42a of the fuel-water separator 42. The fuel outlet pipe 42b of the fuel-water separator 42 is connected, from above, to an end portion of a second fuel supply hose 52. The second fuel supply hose 52 has a U shape so as to go around the fuel-water separator 42. Tat is, the second fuel supply hose 52 passes under the fuel-water separator 42 and reach a front area of the fuel-water separator 42. An upper front end portion of the second fuel supply hose 52 is connected, from below, to the intake pipe 41a of the fuel feed pump 41.

The discharge pipe 41b of the fuel feed pump 41 is connected, from below, to a third fuel supply hose 53. The third fuel supply hose 53 extends linearly substantially vertically upward from the discharge pipe 41b. An upper end portion of the third fuel supply hose 53 is connected, from below, to the fuel inlet pipe 43a of the fuel filter 43.

A distal end portion of the first fuel return hose 61 extending from the fuel tank 30 is connected to the return fuel outlet pipe 43f of the fuel filter 43. The return fuel inlet pipe 43e of the fuel filter 43 is connected to a second fuel return hose 62. The second fuel return hose 62 is connected to an excess fuel outlet of a fuel injection pump (see FIG. 7) of the engine E so as to return excess fuel.

Figure 4:
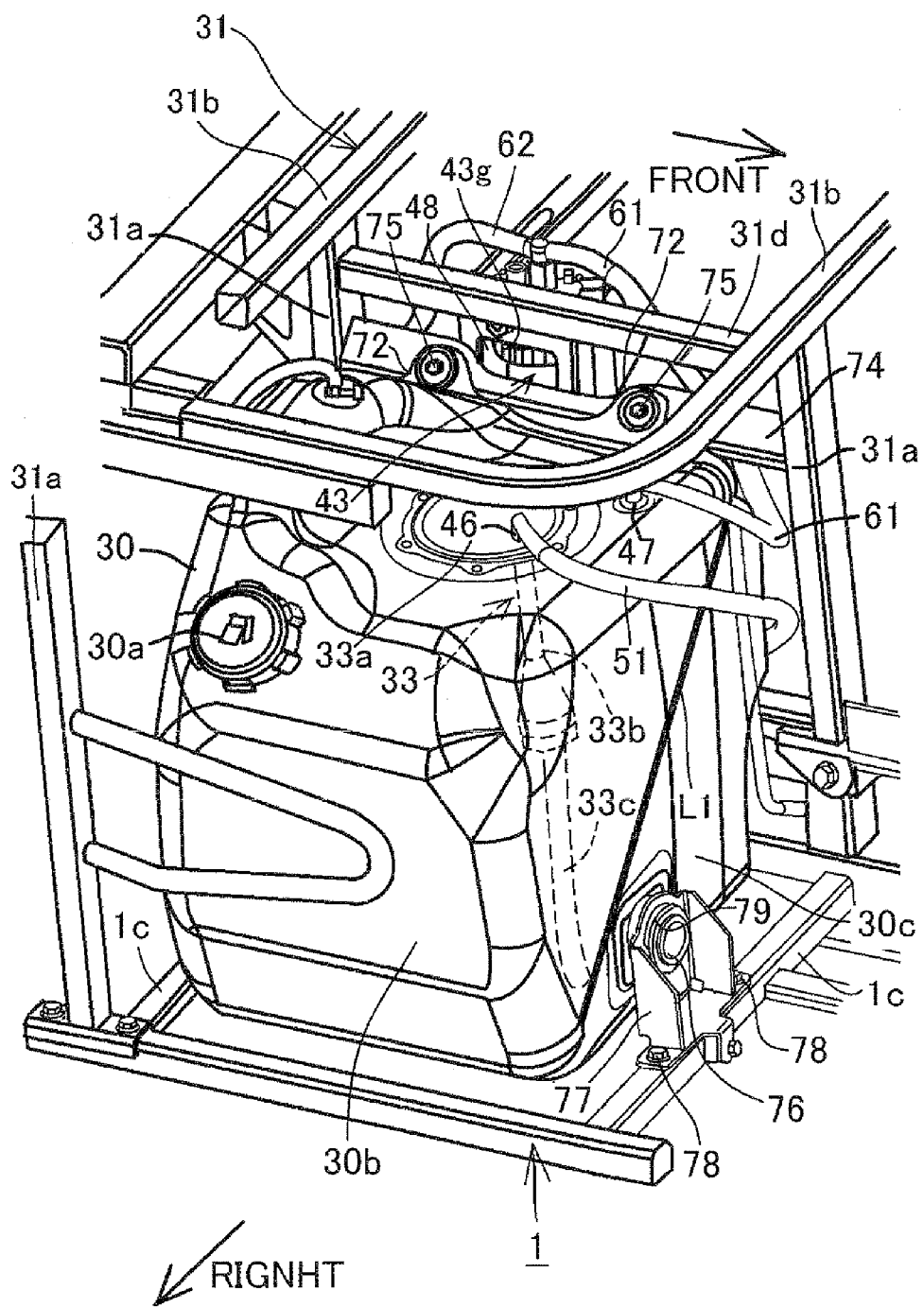
FIG. 4 is a perspective view from upper front right, of a fuel tank of the utility vehicle shown in FIG. 1.

The fuel filter 43 is mounted to the mounting surface 44a by the single bolt 56, and the fuel-water separator 42 is also mounted to the mounting surface 44a by the single bolt 57. The fuel filter 43 and the fuel-water separator 42 thus need to be prevented from rotating about axes of the bolts 56 and 57, respectively. As shown in FIG. 4, in the present embodiment, the fuel filter 43 has an outward flange 43g of which upper surface is engaged with an upper end edge of the lightening hole 48 located at an upper portion so as not to be rotated. The fuel-water separator 42 shown in FIG. 3 similarly has a flange 42g engaged with an upper end edge of the lightening hole 48 located at a lower portion so as not to be rotated.

A structure of the fuel tank 30 is described in detail below. With reference to FIG. 4, the fuel supply fitting 46 of the fuel tank 30 is provided on an upper surface of a fuel intake unit 33. The fuel intake unit 33 includes a circular or disc-shaped mounted plate 33a fixed to an upper wall of the fuel tank 30, a main body 33b extending downward from the mounted plate 33a, and an extension hose 33c detachably connected to a lower surface of the main body 33b and extending to a vicinity of a bottom surface in the fuel tank 30. The extension hose 33c can have any length in accordance with depth of the fuel tank 30. The fuel intake unit 33 can be replaced with an in-tank fuel feed pump.

A fixing structure of the fuel tank 30 is described below. The fuel tank 30 is provided, at an upper left end, with a pair of mounted bosses 72. The mounted bosses 72 are firmly fixed, by bolts 75 and 75 to a support stay 74 bridged between the front and rear leg members 31a and 31a. The mounted bosses 72 are slanted from the horizontal plane so as to project leftward and upward from an upper left end of the fuel tank 30. The support stay 74 is also slanted from the horizontal plane, similarly to the mounted bosses 72.

The fuel tank 30 is provided, at a lower end of a front wall, with a cylindrical forward projection 76 that projects forward. The forward projection 76 is press fitted, from behind, into a cylindrical damper 79 that is fitted to a support hole in a front mounting bracket 77. The front mounting bracket 77 has left and right ends demountably mounted, by bolts 78, to an upper surface of a frame member 1c of the chassis frame 1.

Figure 5:
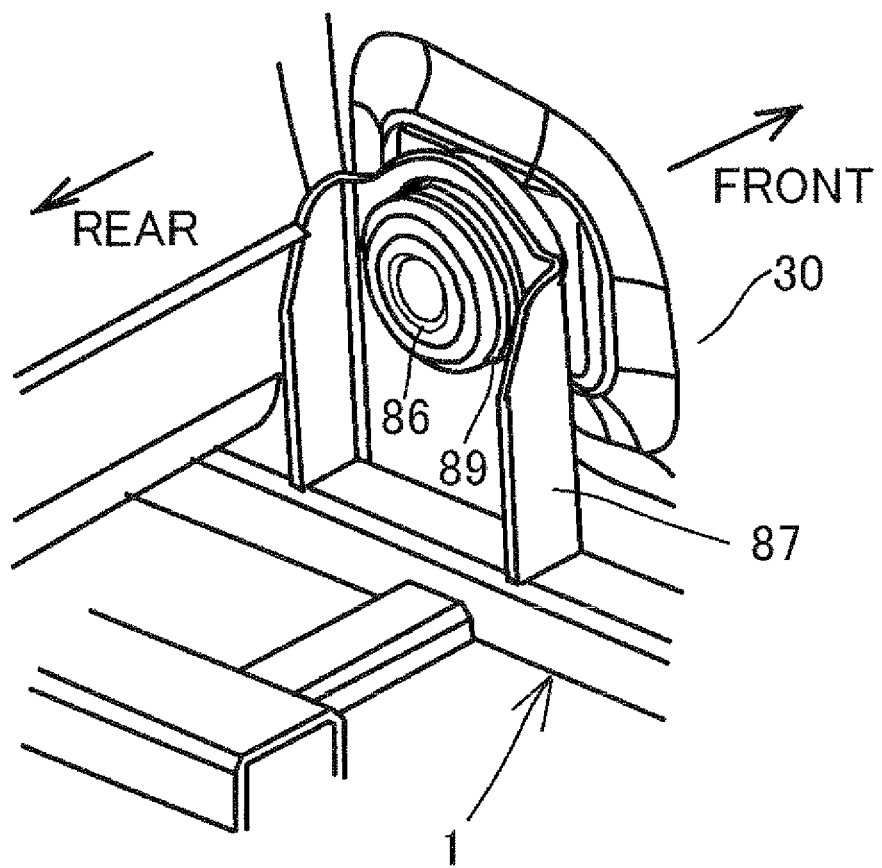
FIG. 5 is a perspective view viewed from rear right, of a mounting portion at the lower rear end of the fuel tank shown in FIG. 4.

FIG. 5 shows a fixing structure at a lower rear end of the fuel tank 30. The fuel tank 30 is provided, at a lower end of a rear wall, with a cylindrical backward projection 86 that projects backward. The backward projection 86 is press fitted, from front, into a cylindrical damper 89 that is fitted to a support hole in a rear mounting bracket 87. Unlike the front mounting bracket 77, the rear mounting bracket 87 is firmly fixed, by welding, to the upper surface of the frame member 1c of the chassis frame 1.

Figure 6:
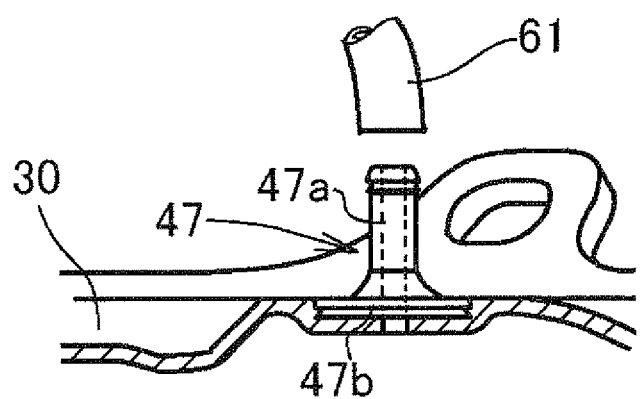
FIG. 6 is an enlarged sectional view of a fuel return hose fitting of the fuel tank shown in FIG. 4.

FIG. 6 is an enlarged sectional view of the fuel return fitting 47 of the fuel tank 30. The fuel return fitting 47 is made of resin, and includes a cylindrical body 47a and an outward flange 47b that is provided integrally with a lower end of the cylindrical body 47a. The outward flange 47b has a retaining annular groove. The flange 47b of the fitting 47 is insert molded into an upper wall of the fuel tank 30 when the fuel tank 30 is resin molded in a molding tool.

Figure 7:
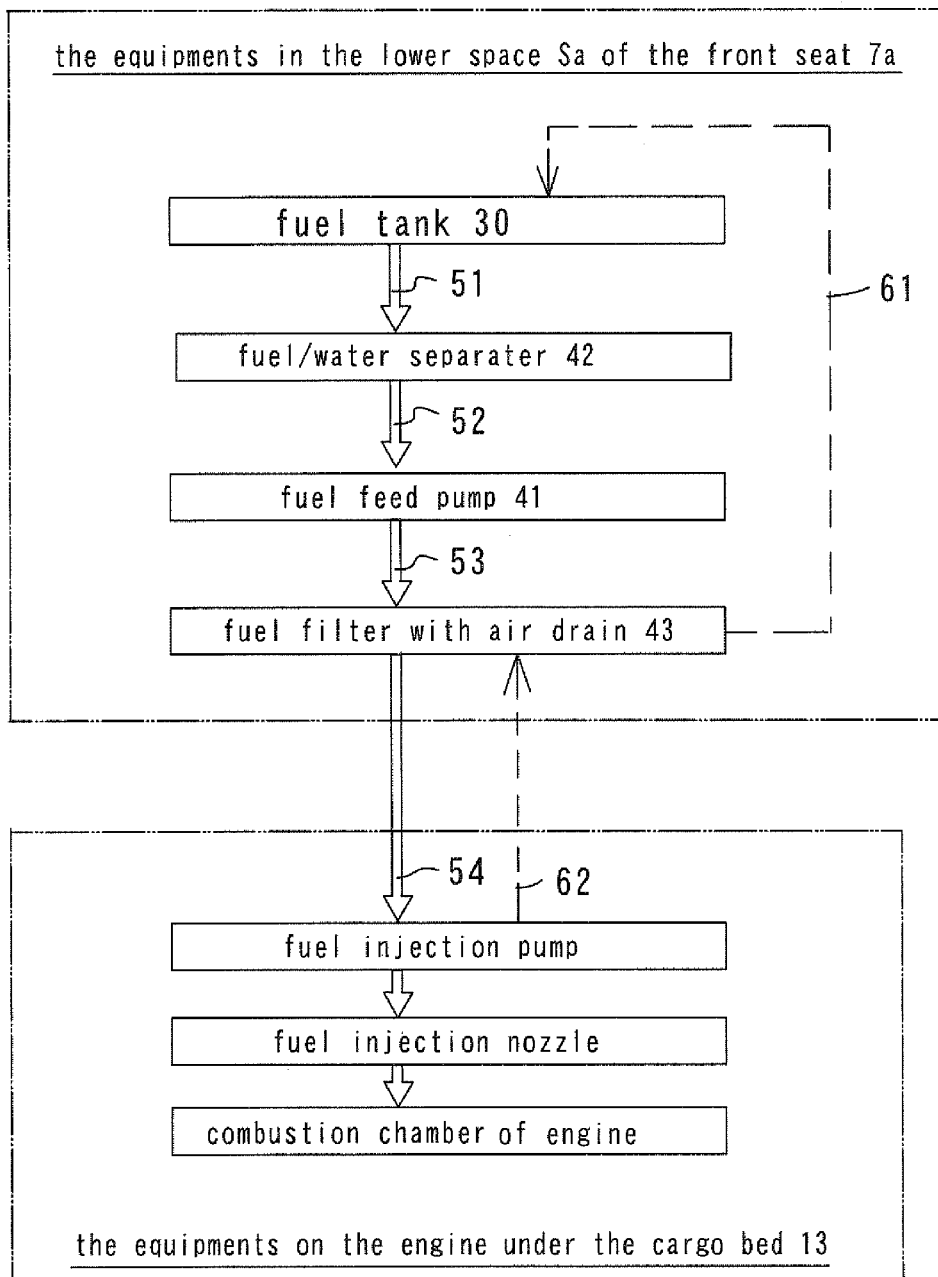
FIG. 7 is a block diagram indicating a flow of fuel in the utility vehicle shown in FIG. 1.

FIG. 7 shows a schematic fuel flow. When the fuel feed pump 41 is driven, fuel in the fuel tank 30 is taken into the fuel feed pump 41 through the fuel-water separator 42. The fuel thus taken is pressurized in the fuel feed pump 41, passes through the fuel filter 43, and is supplied to the fuel injection pump mounted to the diesel engine. The fuel is highly pressurized by the fuel injection pump and is injected from a fuel injection nozzle into an engine combustion chamber. Excess fuel not injected is returned from the fuel injection pump to the fuel tank 30 through the fuel filter 43.

With reference to FIG. 3, the flow of fuel is described more specifically. When the fuel feed pump 41 is driven, fuel taken from the fuel tank 30 passes through the first fuel supply hose 51 and is supplied, through the fuel inlet pipe 42a, into the fuel-water separator 42 in which a water component is separated from the fuel. The fuel then passes through the fuel outlet pipe 42b, flows forward in the second fuel supply hose 52 in the U shape, and is taken into the fuel feed pump 41 through the lower intake pipe 41a. The fuel is pressurized in the fuel feed pump 41, then passes through the discharge pipe 41b, flows substantially vertically upward in the third fuel supply hose 53 above the discharge pipe 41b, and is supplied into the fuel filter 43 through the fuel inlet pipe 43a. The fuel is filtrated and an air component is separated from the fuel in the fuel filter 43. The fuel subsequently passes through the fuel outlet pipe 43b and a fourth fuel supply hose 54, highly pressurized by the fuel injection pump mounted to the engine, and is injected from the fuel injection nozzle into the engine combustion chamber.

The excess fuel not injected flows from the fuel injection pump through the second fuel return hose 62, to the fitting 43d of the fuel filter 43 with the air vent. Air separated from the supplied fuel and discharged from the air vent path 43s joins the return fuel in the fitting 43d. The return fuel with the joined air is returned to the fuel tank 30 through the first fuel return hose 61.

A task of mounting the fuel tank 30 is described below. With reference to FIG. 5, the cylindrical projection 86 on the rear wall of the fuel tank 30 is initially press fitted into the damper 89 of the rear mounting bracket 87 that is firmly fixed to the rear frame member 1c. With reference to FIG. 4, the cylindrical projection 76 on the front wall of the fuel tank 30 is subsequently press fitted to the damper 79 of the front mounting bracket 77 that is not fixed to the front frame member 1c. The front mounting bracket 77 is then fixed to the front frame member 1c by the bolts 78.

As described above, after the front and rear portions of the lower end of the fuel tank 30 is fixed, the mounted pieces 72 at the upper left end of the fuel tank 30 are mounted to the support stay 74 by bolts 75.

EFFECTS OF THE EMBODIMENT (1) The lower space Sa of the seat plate 7a of the front seat 7 accommodates the fuel tank 30, the fuel feed pump 41, the fuel-water separator 42, and the fuel filter 43. The tasks of mounting, demounting, or maintaining the fuel tank 30, the fuel feed pump 41, the fuel-water separator 42, and the fuel filter 43 can be performed simultaneously by opening the seat plate 7a. This configuration improves efficiency of these tasks.

(2) The electrical equipment is accommodated in the electrical equipment storage box 22 in the front chamber, and the battery 21 is accommodated in the lower space of the seat plate 8a of the rear seat 8. The fuel tank 30, the fuel feed pump 41, the fuel-water separator 42, and the fuel filter 43 in the fuel system are accommodated in the lower space Sa of the seat plate 7a of the front seat 7 distant from the electrical equipment and the battery 21. This configuration can locate the electrical equipment allowing a large amount of current to flow therethrough, distant from the fuel system components. Whereby, it becomes easy to maintain electrical equipment.

(3) The fuel tank 30, the fuel feed pump 41, the fuel-water separator 42, and the fuel filter 43 are covered with the seat plate 7a from above, covered with the front cover 24 from front, and covered with the side covers 23 from the right and the left. These fuel system components can be protected from outside and outer appearance thereof can be improved.

(4) The fuel tank 30 is located at the right end in the lower space Sa of the seat plate 7a. This configuration allows the fuel cap 30a to be set at a position easily accessible from a lateral position of the vehicle, and facilitates the task of supplying fuel to the fuel tank 30.

(5) The fuel feed pump 41, the fuel-water separator 42, and the fuel filter 43 are mounted to the single mounting surface 44a of the fuel system mounting bracket 44. The fuel feed pump 41, the fuel-water separator 42, and the fuel filter 43 can be located compactly and the tasks of mounting them can be performed easily in an same direction. This configuration can also shorten the fuel supply hoses 52 and 53 and facilitate the task of laying pipes and hoses in the fuel system.

(6) The fuel system mounting bracket 44 couples the upper and lower coupling members 31d and 31d of the seat frame 31, so that the fuel system mounting bracket 44 can serve as a constituent member of the seat frame 31 and rigidity of the seat frame 31 can be balanced.

(7) The fuel filter 43 is provided, at the upper end, with the air vent path 43s as well as the fitting 43d communicating with the air vent path 43s. The fuel return hoses 61 and 62 are connected to the fitting 43d. This configuration enables air in fuel being supplied to be quickly separated and discharged into the fuel tank 30 through the fuel return path.

(8) The resin fitting 47 connected to the fuel return hose 61 is insert molded into the upper wall of the fuel tank 30 so as to be integral with the tank and project upward. This configuration improves sealing at the fitting portion of the fuel return hose 61 to the fuel tank 30. The resin fitting 47 provided as a member separate from the tank can be alternatively fixed to the tank with a rubber packing or the like being interposed therebetween. The insert molding as mentioned above achieves integration with less sealed portions.

OTHER EMBODIMENTS (1) The present invention is also applicable to a utility vehicle of a single row seat type provided in the cabin S1 with only the front seat 7. The lower space of the seat plate 8a of the rear seat 8 can alternatively accommodate the fuel tank, the fuel feed pump, and the fuel system accessories.

(2) The utility vehicle according to the above embodiment is equipped with the diesel engine. The present invention is also applicable to a utility vehicle equipped with a gasoline engine.

(3) The present invention is not limited to the configurations according to the embodiments described above, but can include various modification examples devisable within the range not departing from the features recited in the following claims.

What is claimed is:

1. A utility vehicle comprising a single or a plurality of seat rows, a cargo bed provided behind the seat rows, a cabin accommodating the seat rows, and an engine, the utility vehicle further comprising:
   a fuel tank accommodated in a lower space of one of the seat rows;
   a fuel system mounting bracket provided next to the fuel tank in the lower space and fixed to a seat frame; and
   a fuel feed pump and a single or a plurality of fuel system accessories mounted to the fuel system mounting bracket.

2. The utility vehicle according to claim 1, wherein the fuel system mounting bracket is bridged between upper and lower frame members of the seat frame.

3. The utility vehicle according to claim 1, wherein the fuel tank is located at an end in a vehicle width direction in the lower space, and the fuel feed pump and the single or the plurality of fuel system accessories are located closer to a center in the vehicle width direction than the fuel tank.

4. The utility vehicle according to claim 1, wherein the single or the plurality of fuel system accessories includes at least one of a fuel filter and a fuel-water separator.

5. The utility vehicle according to claim 1, wherein one of the fuel system accessories is provided, at an upper end, with an air vent path and a fitting for a fuel return hose communicating with the air vent path.

6. The utility vehicle according to claim 1, wherein the fuel system mounting bracket has a single vertical mounting surface, and the fuel feed pump and the single or the plurality of fuel system accessories are mounted to the single mounting surface.

7. The utility vehicle according to claim 1, wherein a resin fitting connected to a fuel return hose is insert molded into an upper wall of the fuel tank to be integral with the tank and project upward.

* * * * *